US007006825B2

(12) United States Patent
Törnkvist

(10) Patent No.: US 7,006,825 B2
(45) Date of Patent: Feb. 28, 2006

(54) METHOD AND SYSTEM FOR FACILITATING SERVICE DELIVERY TO USERS IN A COMMUNICATIONS SYSTEM

(75) Inventor: Robert Törnkvist, Karlshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 12 days.

(21) Appl. No.: 10/500,282

(22) PCT Filed: Nov. 22, 2002

(86) PCT No.: PCT/SE02/02148

§ 371 (c)(1),
(2), (4) Date: Jun. 28, 2004

(87) PCT Pub. No.: WO03/061324

PCT Pub. Date: Jul. 24, 2003

(65) Prior Publication Data

US 2005/0090247 A1 Apr. 28, 2005

(30) Foreign Application Priority Data

Dec. 28, 2001 (SE) .................................... 0104465

(51) Int. Cl.
*H04Q 7/20* (2006.01)

(52) U.S. Cl. ................... 455/432.1; 455/433; 455/466; 455/435.1; 455/432.3; 379/88.25

(58) Field of Classification Search ............. 455/432.1, 455/433, 466, 435.1, 407; 379/88.25
See application file for complete search history.

(56) References Cited

U.S. PATENT DOCUMENTS 5,303,297 A * 4/1994 Hillis ......................... 455/406
5,826,191 A * 10/1998 Krishnan ................. 455/432.2
5,913,165 A * 6/1999 Foti ......................... 455/435.3
5,995,848 A * 11/1999 Nguyen ...................... 455/528
6,101,387 A * 8/2000 Granberg et al. ........... 455/433
6,122,510 A * 9/2000 Granberg .................... 455/433
6,141,549 A * 10/2000 Nguyen ...................... 455/433
6,195,543 B1 * 2/2001 Granberg .................... 455/407
6,470,181 B1 * 10/2002 Maxwell ..................... 455/413
6,496,570 B1 * 12/2002 Nimphius ................ 379/88.25

(Continued)

FOREIGN PATENT DOCUMENTS

WO WO9837685 A2 * 8/1998

(Continued)

OTHER PUBLICATIONS

Swedish Patent Office International Search Report for PCT/SE02/02148 dated Feb. 18, 2003.

*Primary Examiner*—William Trost
*Assistant Examiner*—Sharad Rampuria

(57) ABSTRACT

A method and system of facilitating service delivery to a first user (A) registered with a home network (home PLMN) for a particular service having an associated announcement accessible to a service subsystem (4,9) of the home network in a communications system while the user is roaming in a visited network (visited PLMN) of the communications system. The user is identified for the home network and a connection is initiated from the first user (A) to a second user (B) registered any network of the communications system. The initiated connection is routed to the service subsystem (9) of the home network, the service subsystem (9) of the home network delivers the announcement to the first user, and the service subsystem (9) of the home network establishes a connection between the first and second user (A and B).

19 Claims, 9 Drawing Sheets

U.S. PATENT DOCUMENTS

| | | | | |
|---|---|---|---|---|
| 6,496,689 | B1 * | 12/2002 | Keller et al. | 455/406 |
| 6,529,732 | B1 * | 3/2003 | Vainiomaki et al. | 455/433 |
| 6,633,755 | B1 * | 10/2003 | Haumont | 455/406 |
| 6,728,536 | B1 * | 4/2004 | Basilier et al. | 455/432.1 |
| 6,735,429 | B1 * | 5/2004 | Adamany et al. | 455/410 |
| 6,876,860 | B1 * | 4/2005 | Berg et al. | 455/459 |
| 2002/0049065 | A1 * | 4/2002 | Wallenius | 455/461 |
| 2003/0114160 | A1 * | 6/2003 | Verkama et al. | 455/445 |

FOREIGN PATENT DOCUMENTS

| | | | |
|---|---|---|---|
| WO | WO 0002374 | A1 | 1/2000 |
| WO | WO 0147311 | A1 | 6/2001 |
| WO | WO 0176296 | A1 | 10/2001 |

* cited by examiner

METHOD AND SYSTEM FOR FACILITATING SERVICE DELIVERY TO USERS IN A COMMUNICATIONS SYSTEM

FIELD OF THE INVENTION

The present invention relates to a method and system of facilitating service delivery to users in a communications system, and more particularly to a method and system of facilitating service delivery to a first user registered with a home network for a particular service having an associated announcement accessible to a service subsystem of said home network in a communications system while the user is roaming in a visited network or PLMN of the communications system.

DESCRIPTION OF THE PRIOR ART

Today's mobile telephone communications networks such as GSM, public switched telecommunications networks (PSTN), ISDN, ATM, Internet etc. provide many different more or less sophisticated tele and data communications services for users and providers, regional as well as worldwide. The demands for increased benefit of the network operator, the service provider, and the service subscriber have brought forth the concept of Intelligent Network (IN). An Intelligent Network is a telecommunications concept that meets the market demand, from network operators and service providers, for advanced services within the existing telephony network. IN is a network architecture connected to the basic network (for instance a fixed or mobile network), enabling faster, easier, and more flexible service implementation and service control. This is effected by transferring the service control from the switching centre to a separate functional IN unit. Thus, the service become independent of the basic network operation, and the basic network structure and software need not be changed when services are altered or added. Examples of such services are Premium Rate calls, Mobile Virtual Private Network, Prepaid charging and Personal Number. Different network providers offer different sets of services including both charged and free services.

A number of standard services are available in every GSM network. There are, however, additional non-standard services that have to be agreed on between operators if these services would be available to the users even when they are roaming outside their home network or PLMN (public land mobile network.

Billing for usage of the networks and their associated services is achieved by means of a payment mechanism. Both post-paid and pre-paid systems (PPS) are used. In prior art pre-paid systems it is common practice to load an account with money and then deduct the account balance due to subscriber usage.

In pre-paid as well as post-paid systems it is sometimes necessary to send announcements to users (subscribers) utilising or trying to utilise services delivered by the system. For normal voice calls there are a number of types of announcements, such as Call setup, In call and Call cut-off announcements. “Your account is too low for the call” is one example of a service delivered by the communications system to a user in a pre-paid system, when a user tries to make a call without enough money on its account for the call. During an ongoing call the user may receive the following message “The call will be disconnected due to lack of money”. Another example of an announcement is “Your not allowed to call this number”. These and several other announcements can be sent to users in communications systems or networks. The announcements are not necessarily voice or text announcements, but also tone or data announcements.

At least some of the announcements have to be provided to users of services performed by its home network, both when the user is within its home network and when the user is roaming outside its home network. There are some important aspects to consider particularly in the second case, i.e. when the user is roaming. One aspect is the problem of playing the correct announcement with respect to the action performed by the home network. Another aspect is that, in case of a voice or text announcement and that the user is roaming abroad within the cover of a visited network or PLMN providing announcements in a foreign language, the announcement has to be played or reproduced in a language suitable for the user.

Another problem is to reproduce compound announcements, including a fixed part and a variable part correctly in the language at hand in the country in the network into which the user is roaming. One example of this is an announcement like “You have 72 SEK on your account for usage”, wherein 72 SEK is the variable part. If the text announcement is a standard announcement the visited network has a corresponding announcement in the language of the visited country. However, a problem may sometimes arise in the translation of the variable part, “72” in this case. “72” should not be read “seven two” but rather “seventy two” in english and “zwei und siebzig” in german rather than “siebzig zwei”. The problem is relevant even in other languages and with other variable parts.

The first aspects are addressed by WO98/37685, which discloses a method of delivering announcements to a user of a communications system when roaming in a network other than the user's home network. A service subsystem of the user's home network is caused to pass an announcement—associated with a particular service registered for the user in the home network—to a service subsystem of the visited network. The announcement is transferred to media delivery means of the MSC (mobile switching centre) of the service subsystem of the visited network over a data network, such as SS7 or the Internet. Then, the announcement is delivered from the media delivery means of the visited network, over a bearer connection of the visited network, to the user.

A disadvantage with the method of WO98/37685 is that the numbering and language of announcements have to be coordinated between the operators of the home and visited networks. This can be a huge problem if agreements should be reached and co-ordination should be made between operators around the world.

The 3G TS 23.078 release of the Customised Applications for Mobile network Enhanced Logic (CAMEL) Phase 3—Stage 2 provides guidelines for implementation of a method of playing a “correct” announcement with respect to the action performed by the home network, and playing it in a suitable language for the user, even when the user is roaming in another network than its home network. This method of providing the “correct” announcement in a suitable language is achieved by establishing a temporary connection from the user in the visited network to the home network for announcement delivery, when a connection is initiated from a first user to a second user registered with any network of the communications system. A service subsystem of the home network delivers the announcement to the first user and the temporary connection has to be disconnected before the initiated call is set up between the first and second user.

This CAMEL solution results in increased transmission cost, two different calls has to be set up, one for the announcement and another between the first and second user. Since the user is not aware of this extra connection to the home network, it can be difficult to get paid for that extra temporary connection from the user. Another disadvantage with this CAMEL solution is that the call set-up time is increased, because the two "calls" has to be set up.

SUMMARY OF THE INVENTION

It is an object of the present invention to provide an improved method of facilitating service delivery to a first user registered with a home network or PLMN for a particular service having an associated announcement accessible to a service subsystem of said home network in a communications system while the user is roaming in a visited network or PLMN of the communications system, that overcomes the problem and disadvantages set forth above in connection with the prior art.

This object is achieved by a method of facilitating service delivery to a first user registered with a home network for a particular service having an associated announcement accessible to a service subsystem of the home network in a communications system while the user is roaming in a visited network of the communications system. A connection is initiated from the first user to a second user registered with any network of the communications system. The initiated connection is further routed to the service subsystem of the home network, and the service subsystem of the home network delivers the announcement to the first user. During the same couple the service subsystem of the home network establishes a connection between the first and second user.

A more specific object of the invention is to provide a data processing system and associated software for working the method of facilitating service delivery and associated announcements according to the invention.

This is achieved by a data processing system according to the invention for use in a service subsystem of an electronic communication system, comprising computer processing means for processing data, and storage means connected to said computer processing means for storing data on a storage medium, which receivs information for initiating a connection from said first user to a second user registered with any network of the communications system, establishes a connection with the first user on request for delivery of an announcement to the first user during a couple, and establishes a connection between the first and second user during the same couple.

An advantage of the present invention is that since a majority of calls from mobile phones roaming in a visited network is to the user's home network, the user will have a shorter average call set-up time. It is also more cost effective for the operator since the number of call setups will be decreased. The present invention will have a particular value in prepaid charging systems, because prepaid is a service which frequently makes use of announcements.

BRIEF DESCRIPTION OF THE DRAWINGS

In order to explain the invention in more detail and the advantages and features of the invention, a preferred embodiment will be described in detail below, reference being made to the accompanying drawings, in which.

DETAILED DESCRIPTION OF THE INVENTION

Figure 1:
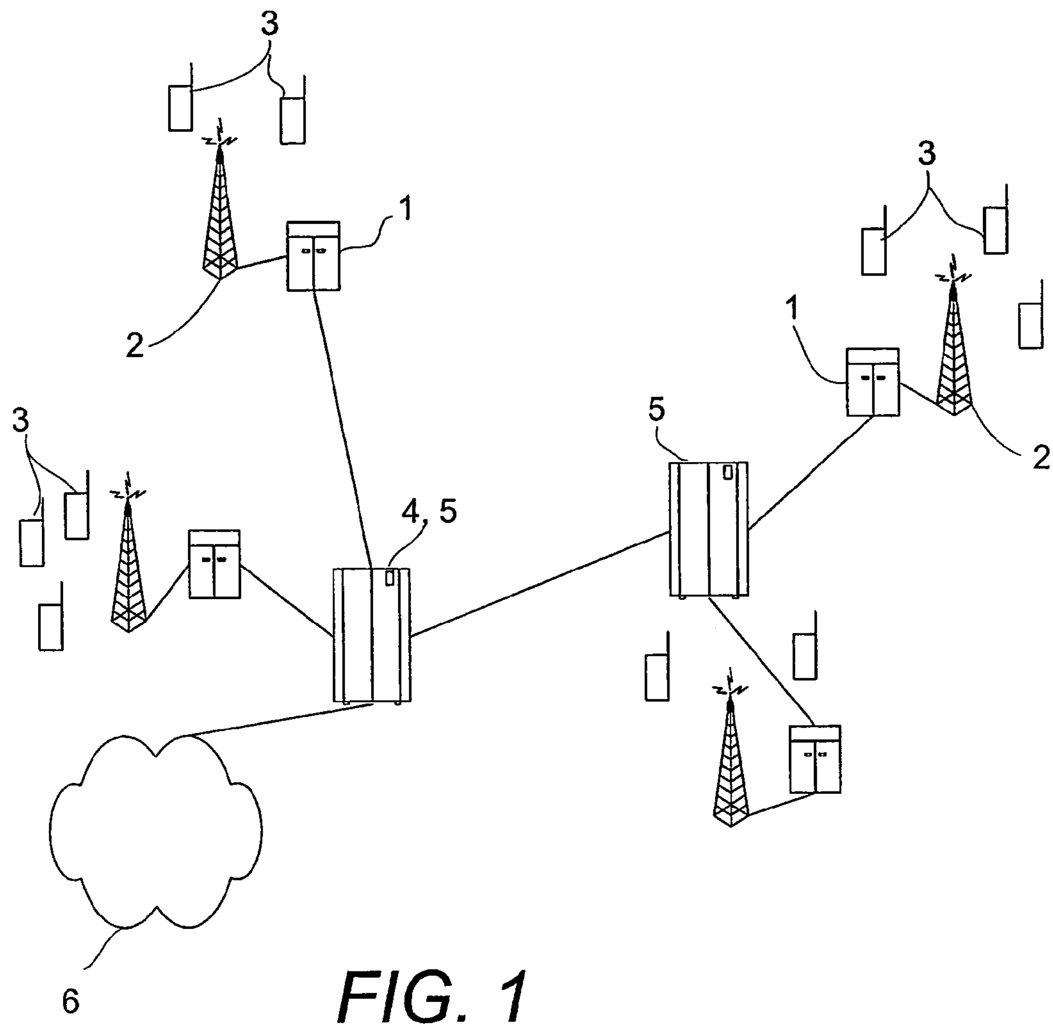
FIG. 1 is a schematical view of a part of a cellular mobile telephone network.

With reference to FIG. 1, a cellular mobile telephone network architecture is shown, which is a service providing network such as an intelligent network (IN) facilitating service delivery according to the invention to users in a communications system.

Cellular telephone service, such as GSM, involves the subdivision of a service area into a number of smaller cells. Each cell requires a base station (BSS) 1 and an antenna 2. The base station 1 performs the switching function as well as the tracking of mobile telephone users. A gateway mobile services switching centre (GMSC) 4 or only mobile services switching centre (MSC) 5 provides the network with specific data about individual mobile phones 1 and operates as an interface towards other networks such as other PLMNs, ISDN or the public switched network (PSTN) 6 in the communications system. The (G)MSC 4 and 5 comprises a data processing system, including a computer processor for processing data, and storage means connected to the computer processor for storing data on a storage medium.

Cellular systems are based on both analogue and digital transmission. Digital cellular systems provide the best quality with the least amount of bandwidth. Different kinds of principles such as TDMA or CDMA technologies are used for digital cellular systems, such as GSM.

Figure 2:
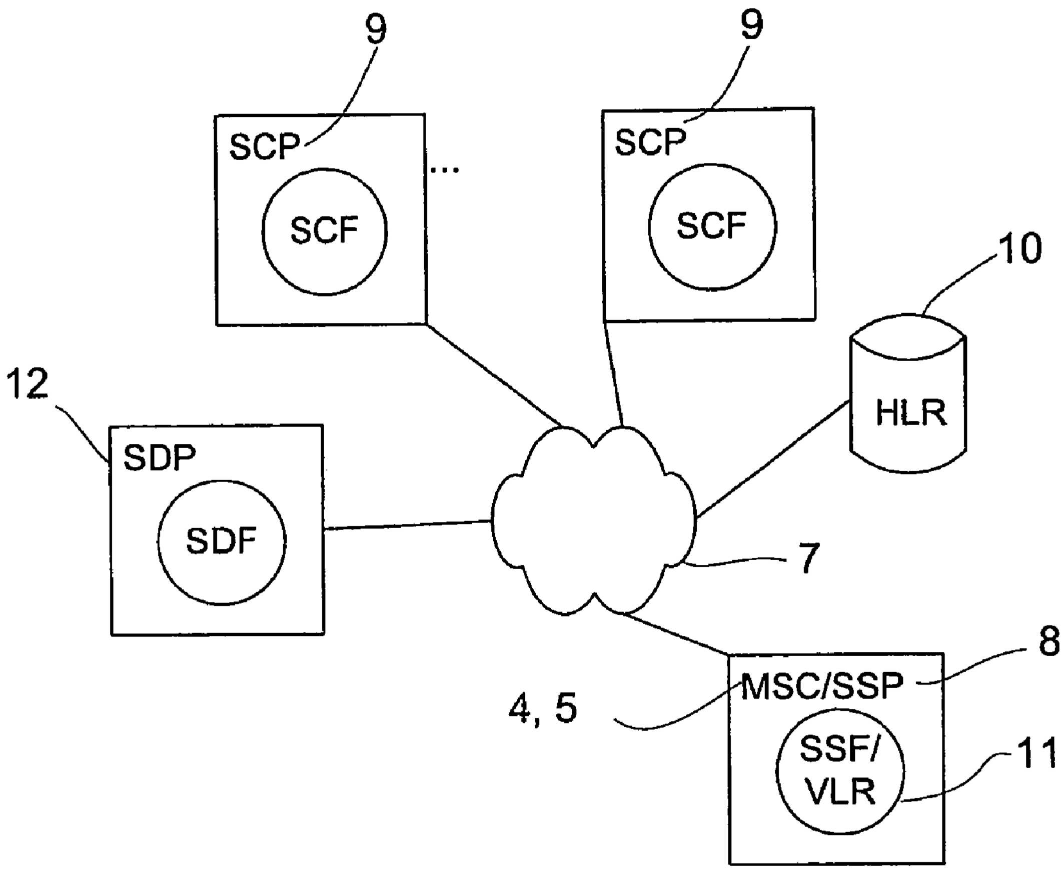
FIG. 2 is a schematical view of an intelligent network (IN) implementation of the network in FIG. 1.

Referring to FIG. 2, there is shown a schematical view of an intelligent network implementation of the network in FIG. 1. The intelligent network IN has a signalling network, which performs message switching between network elements. In this embodiment of the invention, a specific type of signalling protocol, signalling system 7 (SS7), is used for the exchange of information messages and carries many types of information elements, which are useful for intelligent network services. However, SS7 is only an example and the signalling protocol can be another protocol such as the Internet Protocol (IP) etc. Additionally, the intelligent network includes a service switching point (SSP) 8 located in the (G)MSC 4, 5. The SSP 8 detects events indicating a call requiring IN and after this triggering, it suspends call processing and starts a series of transactions with a service control point (SCP) 9. The SCP 9 is a real-time database system that, based on a query from the SSP 8, performs subscriber- or application-specific service logic, controlling the call set-up and call flow. A home location register (HLR) 10 stores the identity and user data of all the subscribers belonging to the area of the related (G)MSC 4, 5. The HLR 10 provides the (G)MSC 4, 5 with the necessary subscriber data when a call is coming from a public switched network (PSTN) 6, an ISDN network, the Internet etc. A visitors location register (VLR) 11 contains relevant data of all mobiles currently located or roaming within a serving (G)MSC 4, 5. The VLR 11 has to support the (G)MSC 4, 5 during call establishment when a call is coming from a mobile telephone 1. A service data point (SDP) 12 is a database containing data service class data and tariff data. Rating and charging analysis is also handled in the SDP 12, in this embodiment.

Before a mobile telephone user can make a phone call or use another service provided by the network he/she has to be either a pre-paid or post-paid "subscriber".

Figure 3:
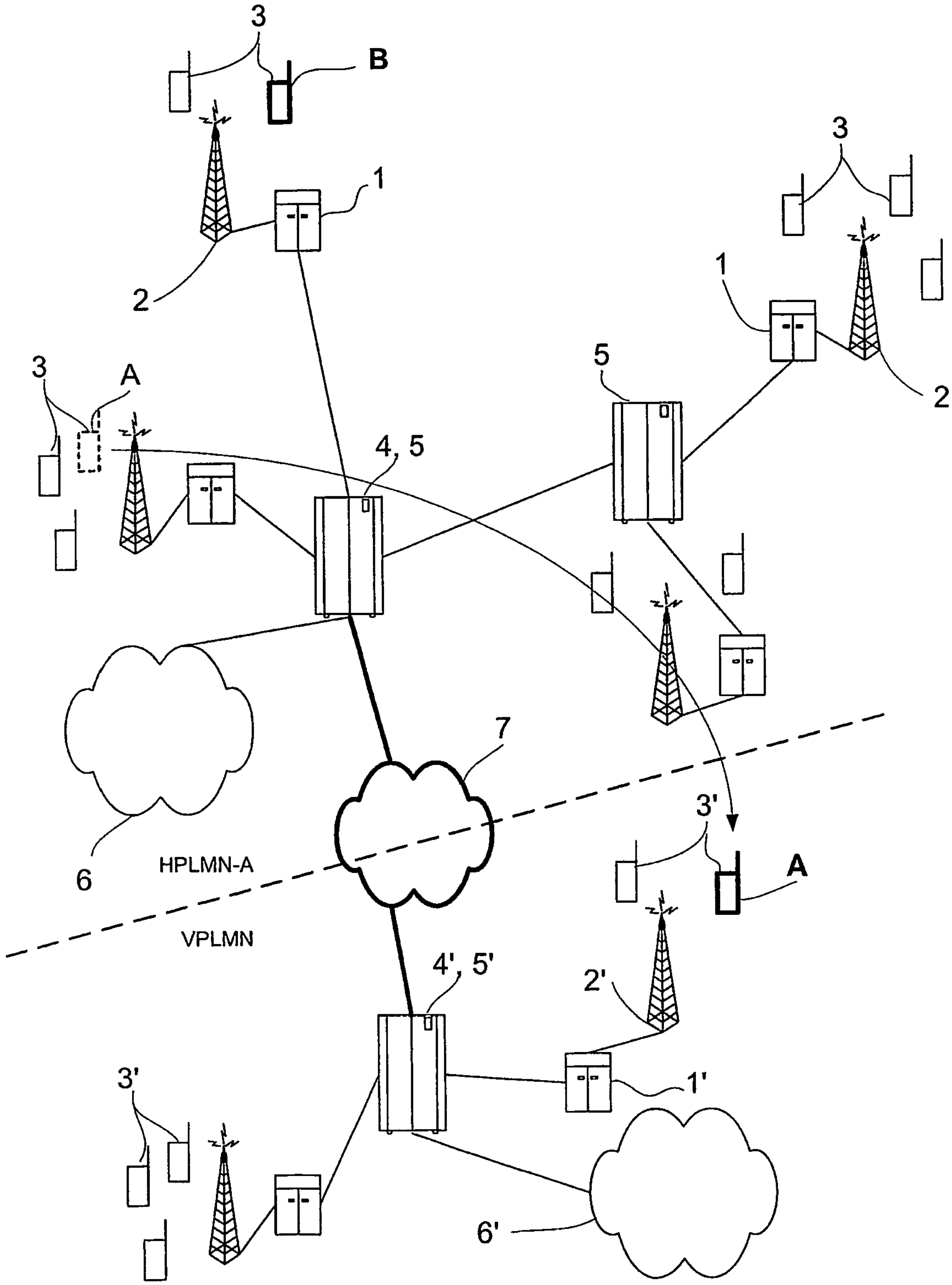
FIG. 3 is a schematical view of a part of a cellular mobile telephone network, including a system of facilitating service announcement delivery according to the invention to users in a communications system.

FIG. 3 is a schematical view of a part of a cellular mobile telephone network, including a system of facilitating service announcement delivery according to the invention to users in a communications system. The different parts or modules numbered 1–6 described in connection with FIG. 1, form part of the cellular mobile telephone home network or home PLMN (public land mobile network) in a first country, for example Sweden. Corresponding parts or modules in FIG. 2 are numbered 1'–6', and form part of the cellular mobile telephone network or visited PLMN in a second country, for example Italy.

A user A of a mobile phone in FIG. 3 is connected to an operator and is a subscriber to a mobile network, its home network or HPLMN-A. This embodiment of the invention illustrates a case of a user being a pre-paid subscriber, but it is not limited thereto. The user is registered for one or more services provided by the home network. Some of the services have associated announcements for delivery to users at suitable occasions. In a pre-paid as well as post-paid systems it is sometimes necessary to send announcements to users (subscribers) utilising or trying to utilise services delivered by the system. In a pre-paid system announcements like "Your account is too low for the call", when a user tries to make a call with not enough money on the account for the call, or "The call will be disconnected due to lack of money" during an ongoing call are possible. These and several other announcements can be sent to users in communications systems or networks and should be send in a language suitable for the user. The announcements are not necessarily voice or text announcements, but also tone or data announcements.

In this embodiment of the invention there are three kinds of announcements available for normal voice calls, namely Call setup, In Call, and Call cut-off announcements. There are also announcements for a refill call or balance inquiry via the IVR (Interactive Voice Response).

Call setup announcement: Call setup announcements are announcements played before the call is set up towards the called party or as a result of the calling party being barred from reaching the called destination.

In Call announcement: The service plays an In call announcement at a configurable time before call cut-off due to account depletion and is normally realised as a tone.

Call cut-off announcement: The Call cut-off announcement is played before the disconnection of a call. It is used to inform the subscriber that there is not enough money on the account for the call to continue.

Announcements via IVR: By giving announcements and voice prompts to the subscriber, and receiving DTMF in response, the IVR helps the caller to refill their account or to do balance inquiry.

Text messages providing the subscriber with information on their account are sent by means of Unstructured Supplementary Services Data (USSD). There are two messages that can be sent to the end user, balance inquiry information and notification at the end of call in this embodiment.

Balance inquiry: It is possible for a subscriber to get the account balance presented on the display of the mobile by sending a USSD message including a service code.

Notification at end of call: As an optional feature offered on a Service Class Basis, PPS can send the cost of the last call and the new account balance after each charged call or event.

When a user, for example the user A in FIG. 3, roams from its home network in Sweden to a visited network or PLMN in Italy, standard services for which the user has registered in its home network are still available in the visited network. The roaming is illustrated by an arc shaped arrow from a dashed lined phone A in the home network area to a bold lined phone A in the visited network in FIG. 3. The bold dashed line in the middle of FIG. 3 illustrates the "borderline" between the home and visited network.

The "cloud" on the borderline represents a transmission network or networks 7 for signal transmission (SS7) and speech and/or data transmission. For example, the GSM system uses TDMA for speech transmission. The signal and speech transmission can use a common network or separate networks.

Figure 4:
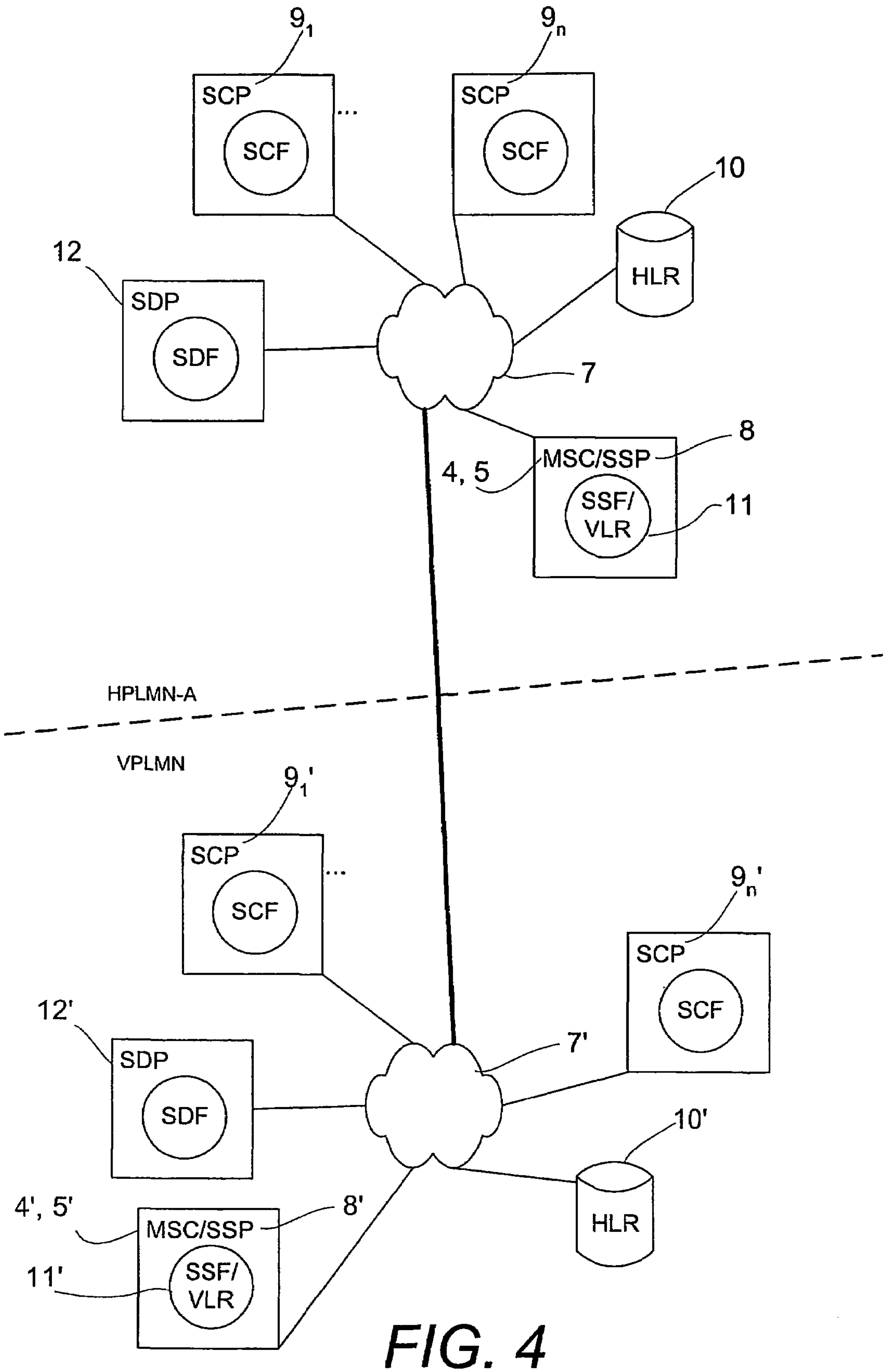
FIG. 4 is a schematical view of an intelligent network implementation of the network in FIG. 3.

Referring no to FIG. 4, there is shown a schematical view of an intelligent network implementation of a part of the network in FIG. 3. As mentioned above, the intelligent network IN has a signalling network, which performs message switching between network elements. In this embodiment of the invention, the specific type of signalling protocol, signalling system SS7, which is useful for intelligent network services, is used for the exchange of information messages and carries many types of information elements within the home network as well as over the "borderline" to/from the visited network. However, SS7 is only an example and the signalling protocol can be another protocol such as the Internet Protocol (IP). The different parts or modules numbered 4–12 also described in connection with FIG. 2, form part of the signalling network of the home PLMN (public land mobile network). Corresponding parts or modules in FIG. 4 are numbered 4'–12', and form part of the signalling network or visited PLMN.

The method according to the present invention of facilitating service delivery to a first user registered with a home network for a particular service having an associated announcement accessible to a service subsystem of the home network HPLMN-A in a communications system, while the user is roaming in a visited network VPLMN of the communications system, is described in connection with a signalling diagram in FIG. 5 and the combined signalling (dashed line) and data/voice (solid line) path diagrams in FIG. 6–9.

Figure 5:
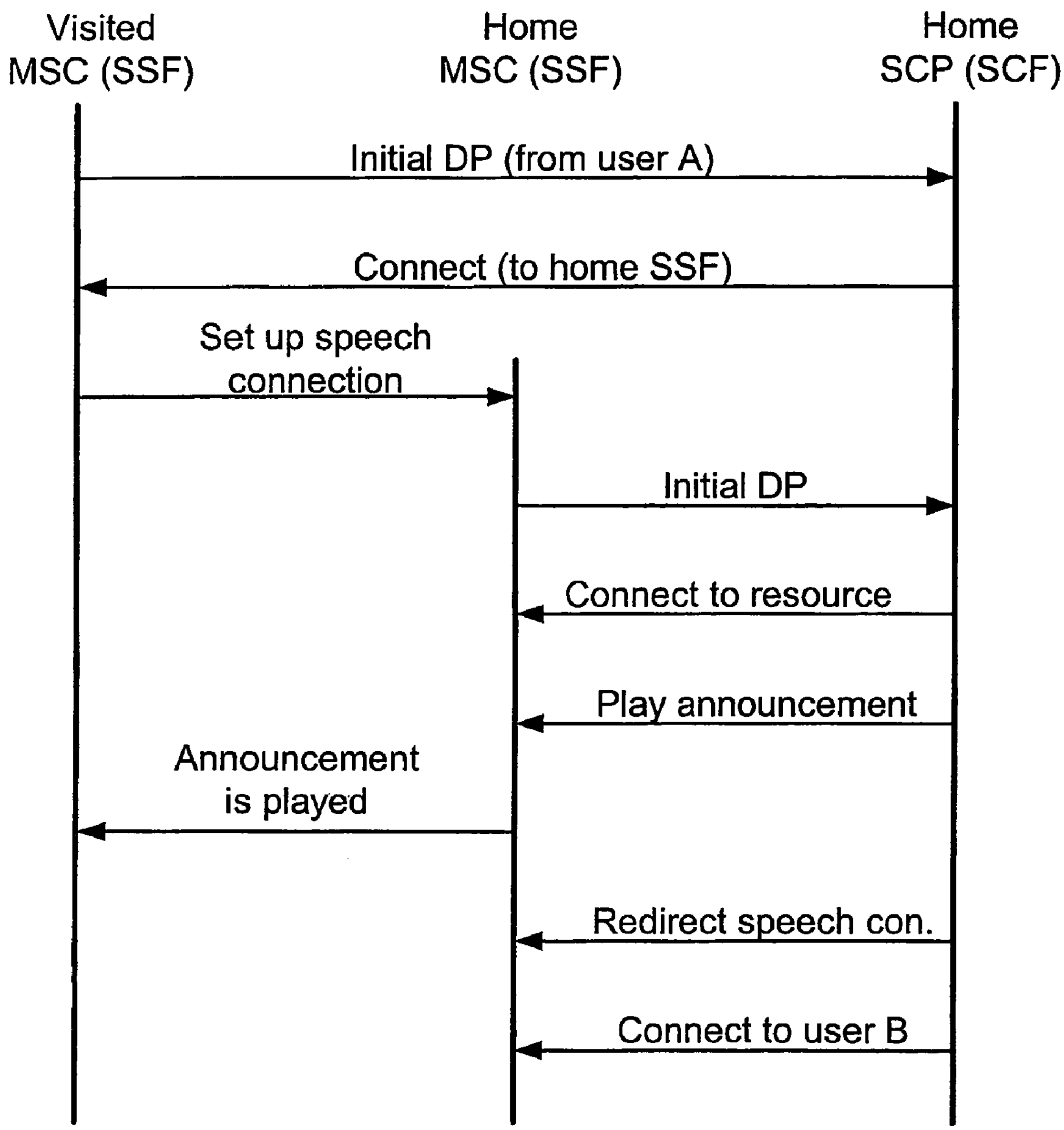
FIG. 5 is a signalling diagram illustrating an embodiment of the method according to the invention.

The vertical bar to the left in FIG. 5 represents the (G)MSC 4', 5' and its SSF of the visited network in FIGS. 3 and 4. The bar in the middle represents the (G)MSC 4, 5 and its SSF in the home network, and the bar to the right represents the SCF in the SCP $\mathbf{9}_1$ of the home network.

Figure 6:
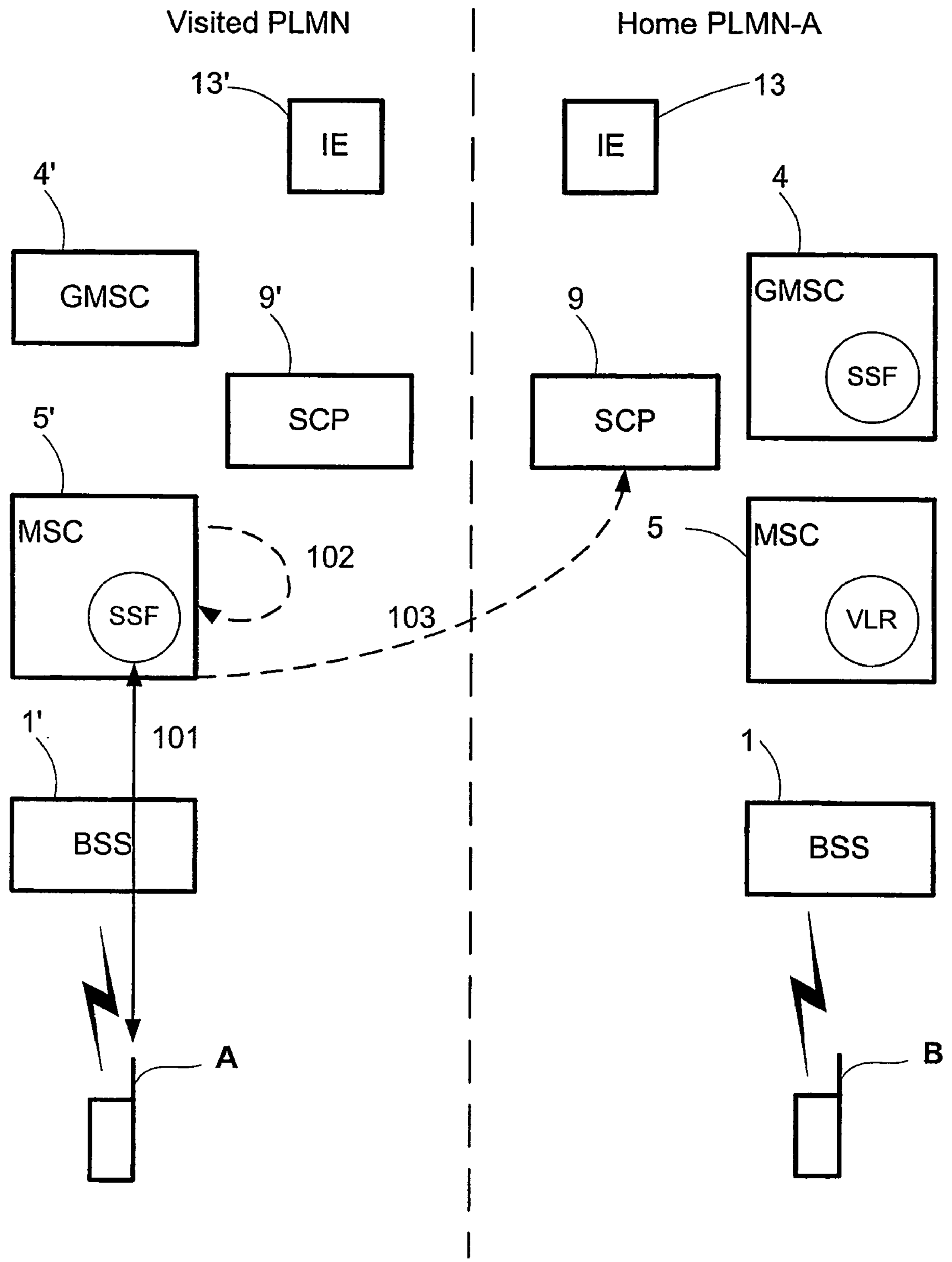
FIG. 6 is a flow chart of a first part of the method of facilitating service delivery users in a communications system.

With reference to FIG. 6, a call is initiated from the user A—when he is roaming in the visited network—to a user B in the home network of user A in step 101. A dials the number e.g. +46703102030 to B. The access signal reaches the MSC 5' that is serving A's mobile station (MSC-VPLMN). The MSC 5' checks the VLR for A's subscriber data and finds that O-CSI is active[a] and that IN is needed. The traffic control subsystem of the MSC 5' in the VPLMN calls for IN assistance by passing an IN Service Trigger[b] (IST) to the SSF in step 102. The datastructures described below is not defined in the standard and actual implementation may vary.

a. O-CSI may be set to on/off. If it is set to on, the O-CSI also indicates the service and the SCP for the service as follows: [on|service_key|SCP_address]

b. The IST includes O-CSI data, reason for the triggering and other data as follows: [trigger_type|service_key|SCP_address| . . . ].

The SSF of the MSC 5' in the visited network determines the relevant trigger table, based on the IST. Further, the SSF interrogates the SCF of the SCP 9 in the home network by sending an Initial DP (a CAMEL message), i.e. invokes a service in the SCF and provides call data to the SCF for the service in step 103.

Figure 7:
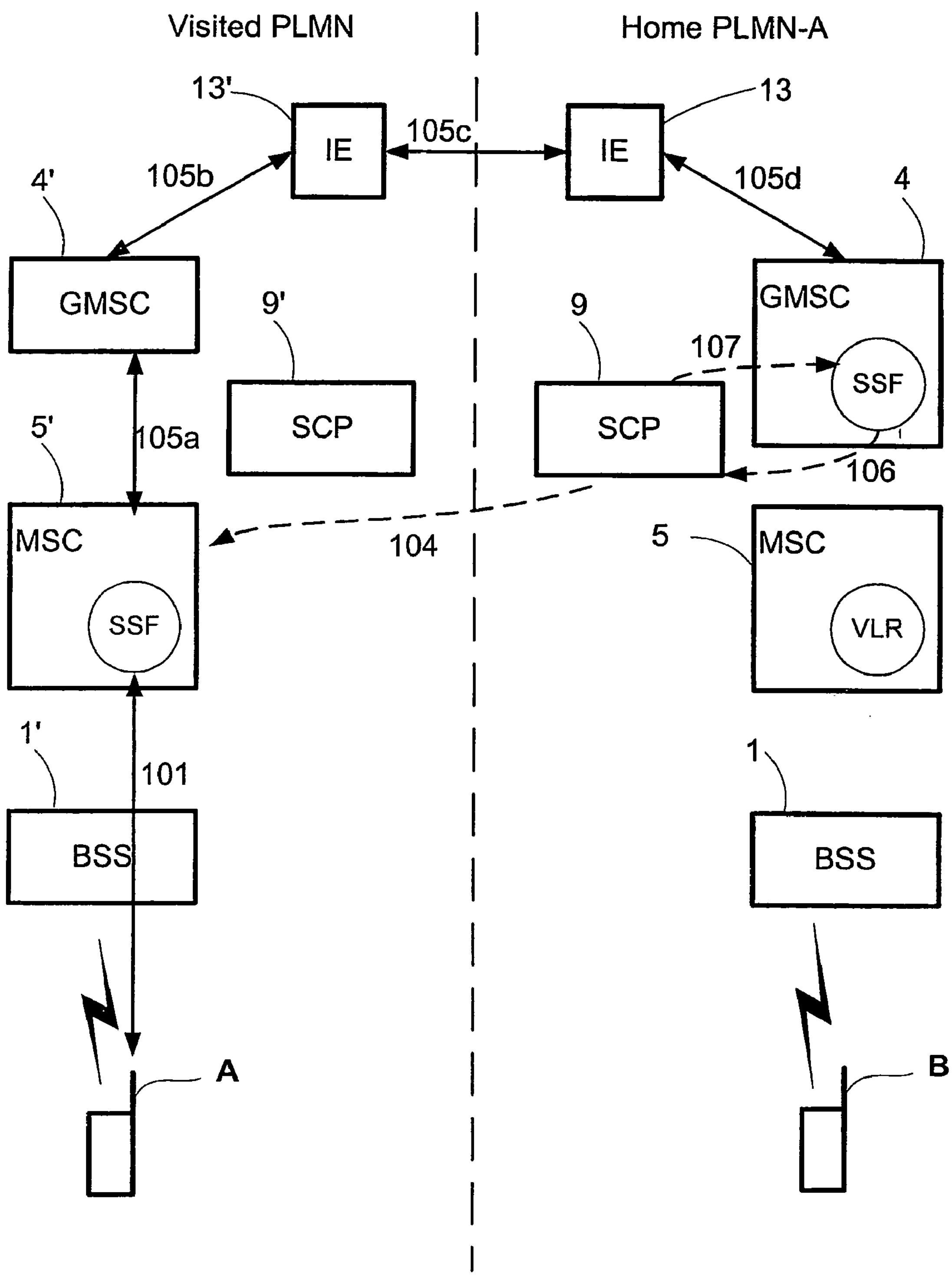
FIG. 7 is a flow chart of a second part of the method of facilitating service delivery users in a communications system.

With reference to FIG. 7, the prep aid IN logic in the SCP 9 starts to execute and checks for example that there is enough funds on the account to cover the cost of the call. In a case where A is running out of funds the announcement "You have 5 dollars left" should be played to the user. The SCF of the SCP 9 in the home network instructs the SSF of the MSC 5' in the visited network to set up a connection or couple to the (G)MSC 4 in the home network. That is, the SCP 9 passes the control and and instructs the SSF in the MSC 5' of the VPLMN to set up the call towards a predetermined special number in the HPLMN in step 104, this special number is denoted B*.

The SCP 9 also compiles data necessary to later retrieve call status, (CallStatusData). CallStatusData may include the type of service, e.g. prepaid, A-number, B-number, announcement reference and a call identity (call_id), which are transferred to the SSF of the MSC 5' in step 104.

In step 105*a–d*, the SSF of the MSC 5' in the visited network sets up a connection or couple to the SSF of the GMSC 4 in the home network via international exchanges 13',13, using the received B*-number and CallStatusData or call_id being transferred. When the GMSC 4 in the home network receives a call to the B*-number it detects this as a call requiring IN. This detection may be either coded in the GMSC 4/MSC 5 or the B*-number could be defined in the HLR/VLR as a subscription number requiring IN (O-CSI active). Anyhow the IN will be triggered analogous to step 102 above. This process is normally referred to as Number Based Triggering or in CAMEL as Serving Network Dialled Services.

Instead of passing CallStatusData in step 104, the necessary data can alternatively be saved in the SCP (or SDP Service Data Point) in step 103 and only the call_id is passed in the connect operation in step 104.

A problem is that some older international signalling schemes like for example CCITT No. 5 would remove not known information like the CallStatusData or call_id. A solution to this problem in the alternative where the call_id is sent is to use parts of the number space of the B*-number (normally 15 digits). One example could be <467039999 112233> where the 9999 is the HPLMN unique B*-number and 112233 is the call_id. A solution to further extend the address space for the call_id would be to use the over decadic TBCD (Telephony Binary Coded Digits) characters like * or #.

In the latter case, and when the B*-number is defined as Serving Network Dialled Service number in the HLR/VLR, the MSC/GMSC would have to detect that it is such a number so that the call_id may be removed before doing HLR/VLR database look up.

An Initial DP CAMEL message including the CallStatusData or call_id needed to restore the call state and continue service execution is also sent from the SSF of the GMSC 5 in the home network to the SCF of the SCP 9 in the home network in step 106. Other protocols than CAMEL, like CS1/CS1+ can be used for intra-PLMN IN signalling in alternative embodiments of the invention.

The SCF in the home network instructs in step 107 the SSF in the home network to play or generate an announcement for the user over the connection (speech transmission channel) set up in step 105*a–d*. These and other not mentioned components operating in the delivery of a service and an associated announcement are referred to as the service subsystem. If the SSF and SRF are co-located, the SCP instructs the SSF to connect to the Service Resource Function SRF 14, an announcement machine in this embodiment, by sending the (CAMEL) operation ConnectToResource. The SCP then uses the (CAMEL) operation PlayAnnouncement to order the SSF to order the announcement to be played. If the SRF is standalone it would normally have a so called assisting SSF. In the standalone case the SCP would directly connect to the SRF.

Figure 8:
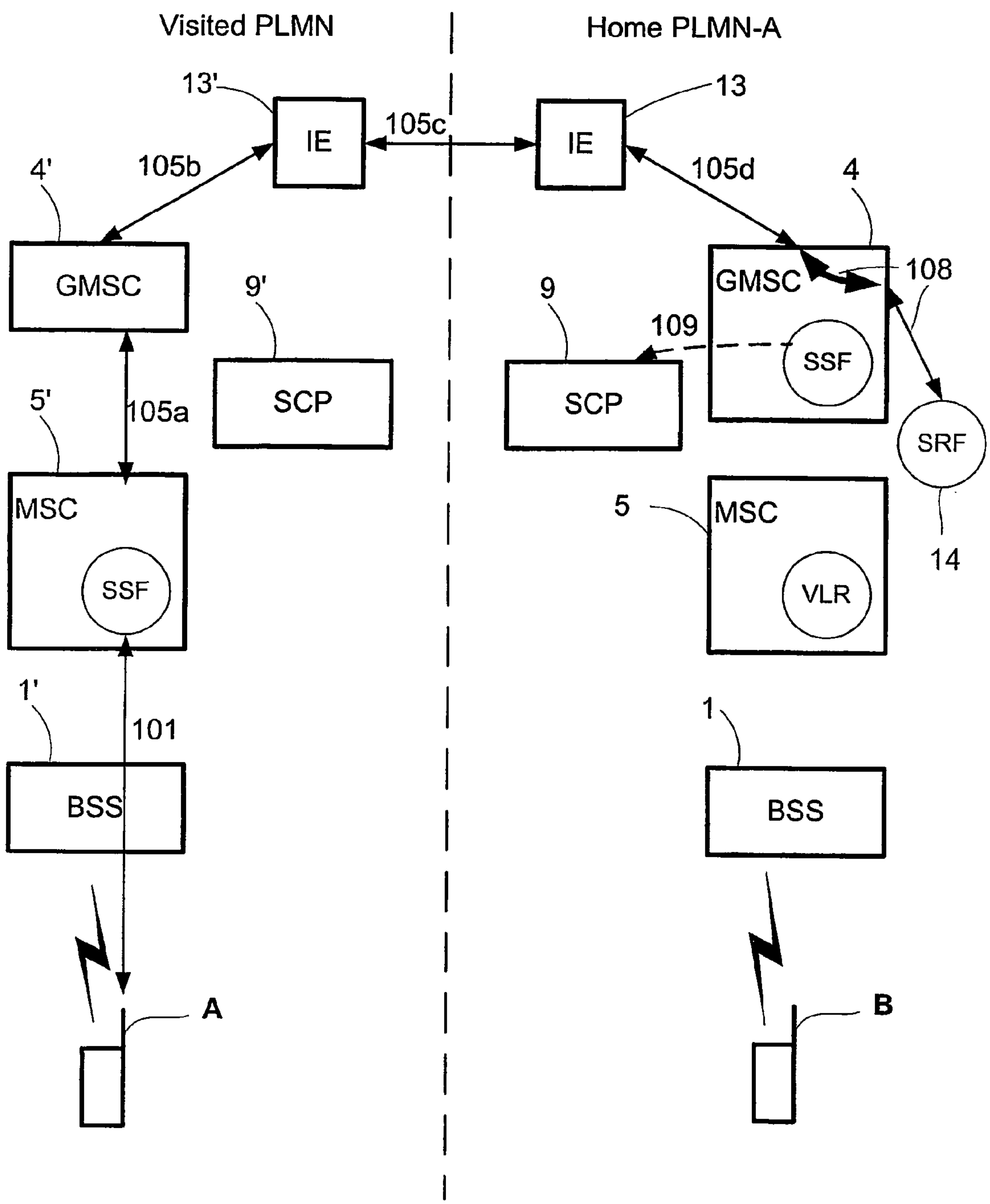
FIG. 8 is a flow chart of a third part of the method of facilitating service delivery users in a communications system.

With reference to FIG. 8, the SSF of the GMSC 4 instructs the traffic control system to connect the announcement machine and the announcement is played to A in step 108. Then, the SRF 14 in the home network plays the announcement, transparently through the MSC 5' in the visited network, via the speech transmission channel further to the user A.

The SSF surveys the announcement and is notified when the announcement is played and the connection is closed. When this occurs the SSF notifies the SCP about the event with the (CAMEL) operation SpecializedResourceReport in step 109. This report may be omitted by instead using for example a timer to track when the announcement have been played.

Figure 9:
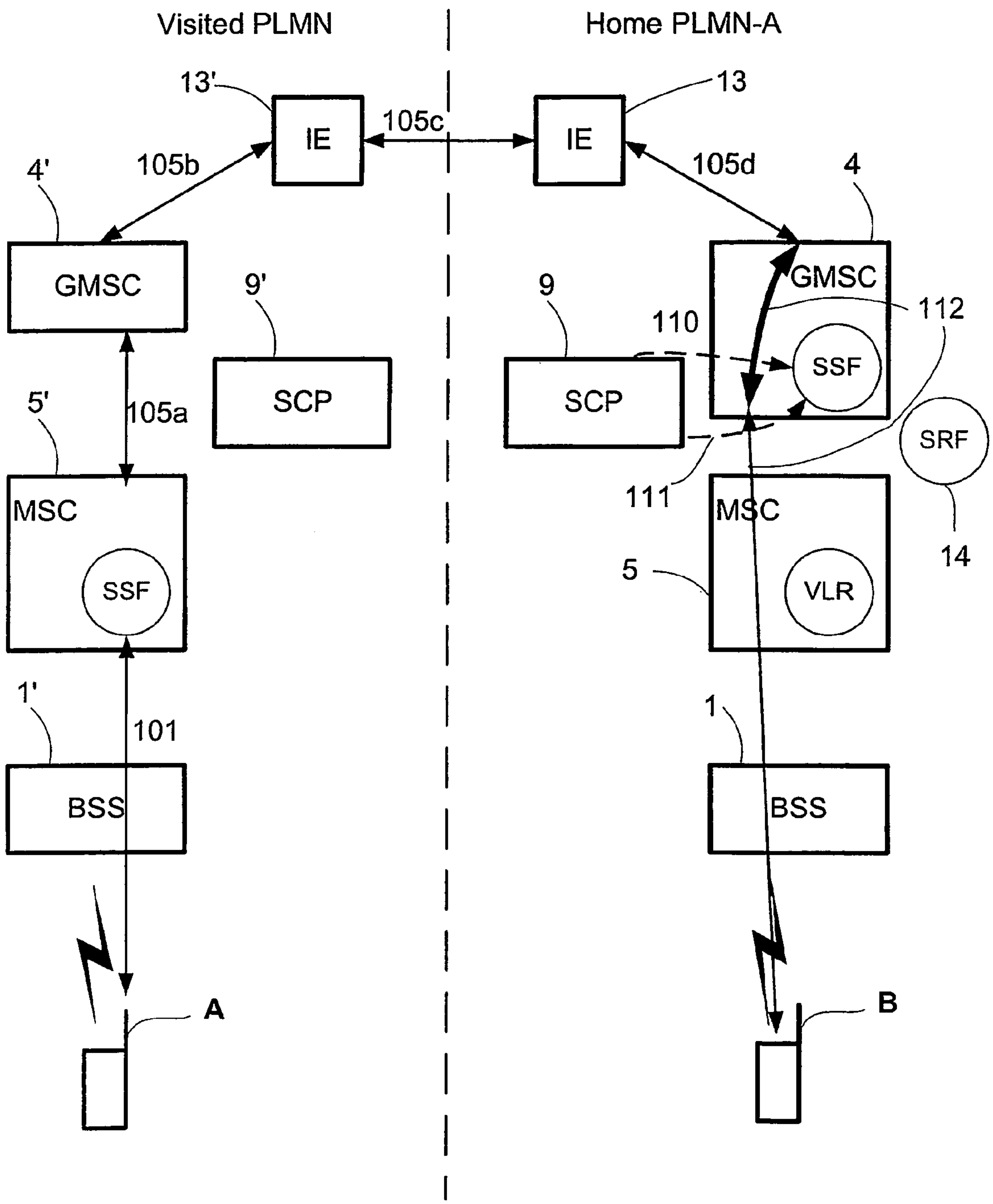
FIG. 9 is a flow chart of a fourth part of the method of facilitating service delivery users in a communications system.

Referring now to FIG. 9, the SCP 9 instructs the SSF of the GMSC 4 in the home network to disconnect from the SRF or the announcement machine by sending CAMEL operation DisconnectForwardConnection in step 110.

The disconnection may also be done implicit at end of announcement by the SRF or by the SSF. Next, the SCP 9 instructs the SSF to connect the call to B using the (CAMEL) operation Connect in step 111. The connection already set up between the SSF of the MSC 5' in the visited network and the SSF of the GMSC 4 in the home network for the initiated call from the user A to user B is redirected to the user B.

The SSF sets up the call leg to B and connects the incoming and outgoing legs in step 112.

The call is surveyed and finally torn down according to known GSM/IN/Prepaid principles and is not further described here.

The method of the present invention is preferably implemented in computer software executable preferably by a distributed data processing system forming part of the overall communication system. More specifically, the service subsystem forms part of the SCP and the SCF and is either a separate data processing system or is a subsystem of the overall communication system for communication with other devices, components or data processing system/s in the communication system of the network. In one embodiment of the data processing system according to the invention it comprises a computer processor for processing data, and a storage connected to the computer processor for storing data on a storage medium.

In this embodiment of the invention, the computer processor of the service subsystem in the home network is configured to receive information identifying the presence of the user in the visited network and information for initiating a connection from a first user to a second user registered with any network of the communications system. The data processing system is further configured to establish a connection with the first user on request for delivery of an announcement to the first user under a couple, and establish a connection between the first and second user during the same couple. The announcement can be delivered either before the connection is established between the first and second user or even during an already established connection.

It should be apparent that the present invention provides an improved method and system for use in an electronic communication network, providing real-time updating of available network service access for stations connected to the network, and necessary functionality for a pre/post-paid system, that fully satisfies the aims and advantages set forth above. Although the invention has been described in conjunction with a specific embodiment thereof, this invention is susceptible of embodiments in different forms, with the understanding that the present disclosure is to be considered as an exemplification of the principles of the invention and is not intended to limit the invention to the specific embodiment illustrated.

Although the method is described in conjunction with a mobile telephone call in an intelligent network the method is applicable on any communication session and other communication services in other kind of networks. For example, the method and system according to the invention are applicable in other mobile telephone networks, public switched telecommunications networks (PSTN), ISDN, ATM, Internet etc., which provide many different more or less sophisticated tele and data communications services for users and providers.

Further, not just announcements is handled by the method and system according to the invention, but any service requiring assist from a Service Resource Point/Function.

The services is not limited to beginning of call, but could also be in-call or at end of call within the scope of the invention.

What is claimed is:

1. A method of facilitating service delivery to a first user registered with a home network for a particular service having an associated service accessible to a service subsystem of said home network in a communications system while the first user is roaming in a visited network of the communications system, comprising:

initiating a connection between said first user and a second user registered with any network of said communications system, a subsystem of said visited network, sending an invocation of a service to said service subsystem of said home network, establishing call status data necessary for re-establishment of call state of said service subsystem, storing said call status data in a storage of said service subsystem, said service subsystem of said home network instructing said subsystem of the visited network to set up a connection between the first user via said subsystem of the visited network to the service subsystem of the home network, setting up said connection, detecting, by the home network, the connection as a connection requiring Intelligent Network service, wherein the detecting includes calling a specific number, delivering the associated service to the first user via said connection, disconnecting the delivery of said associated service, and redirecting said connection from said first user to said second user.

2. A method of facilitating service delivery to a first user registered with a home network for a particular service while the first user is roaming in a visited network of the communications system, the method comprising:

initiating a connection between said first user and a second user registered with any network of said communications system, sending, by a subsystem of said visited network, an invocation of a service to a service subsystem of said home network which has access to an associated service for the particular service, instructing, by said service subsystem of said home network, said subsystem of the visited network to set up a connection between the first user via said subsystem of the visited network to the service subsystem of the home network, setting up said connection, delivering the associated service to the first user via said connection, disconnecting the delivery of said associated service, and redirecting said connection from said first user to said second user.

3. The method of claim 2, further comprising establishing call status data necessary for re-establishment of call state of said service subsystem.

4. The method of claim 2, further comprising the home network detecting the connection as a connection requiring Intelligent Network service.

5. The method of claim 4, wherein said detection is performed by a call to a specific number.

6. The method of claim 2, further comprising storing said call status data in a storage of said service subsystem.

7. The method of claim 6, wherein the method comprises, after the step of setting up said connection, the further step of retrieving said stored call status data of said connection from said memory means for use in delivering said service.

8. The method of claim 2, wherein the steps of instructing said subsystem of the visited network to set up a connection, and setting up said connection, including the transfer of a call identity of said initiated connection.

9. The method of claim 3, wherein the steps of instructing said subsystem of the visited network to set up a connection, and selling up said connection, including the transfer of said call status data.

10. The method of claim 9, further comprising using said call status data to re-establish call state of said connection.

11. The method of claim 3, wherein the call status data comprises the type of service, the number of the first user and the number of the second user.

12. The method of any of the claim 5, wherein the call identity is a part of said specific number.

13. The method of claim 2, wherein the associated service is an announcement.

14. The method of claim 2, wherein said second user is identified as being within said home network of said first user.

15. A data processing system for use in an electronic communication system facilitating service delivery to a first user registered with a home network for a particular service having an associated announcement accessible to a service subsystem of said home network in said communications system while the user is roaming in a visited network of the communications system, comprising distributed computer processing means for processing data, storage means connected to said distributed computer processing means for storing data on a storage medium, wherein that said distributed computer processing means of said communication system is configured to execute the method claim 1.

16. A data processing system according to claim 15, wherein said communications system is a mobile communications system.

17. A data processing system comprising:

a computer processing means for processing data for use in a service subsystem of an electronic communication system facilitating service delivery to a first user registered with a home network for a particular service having an associated announcement accessible to said service subsystem of said home network in said communications system while the user is roaming in a visited network of the communications system, a storage means connected to said computer processing means for storing data on a storage medium, wherein said computer processing means of said service subsystem of said home network is configured to:

receive an invocation of a service from a subsystem of said visited network, instruct said subsystem of the visited network to set up a connection between the first user via said subsystem of the visited network to the service subsystem of the home network, delivering the associated service to the first user via said connection, disconnect the delivery of said associated service, and redirect said connection from said first user to said second user.

18. A data processing system according to claim 17, wherein said communications system is a mobile communications system.

19. A computer program element comprising computer program code means to make a distributed data processing system for use in a communications system, facilitating service delivery to a first user registered with a home network for a particular service having an associated announcement accessible to a service subsystem of said home network in said communications system while the user is roaming in a visited network of the communications system, to perform the method of claim 1.

* * * * *

UNITED STATES PATENT AND TRADEMARK OFFICE

CERTIFICATE OF CORRECTION

PATENT NO. : 7,006,825 B2
APPLICATION NO. : 10/500282
DATED : February 28, 2006
INVENTOR(S) : Tornkvist It is certified that error appears in the above-identified patent and that said Letters Patent is hereby corrected as shown below:

In Column 10, Line 59, in Claim 9, delete “selling” and insert -- setting --, therefor.

Signed and Sealed this

Twenty-seventh Day of November, 2007

JON W. DUDAS
*Director of the United States Patent and Trademark Office*